United States Patent [19]
Augspurger

[11] 3,866,598

[45] Feb. 18, 1975

[54] PROCESSES FOR REPRODUCTION OF CELLULAR BODIES

[76] Inventor: Lynn Lawrence Augspurger, 642 Fairfax, Birmingham, Mich. 48009

[22] Filed: Feb. 20, 1974

[21] Appl. No.: 444,022

Related U.S. Application Data

[63] Continuation-in-part of Ser. No. 418,604, Nov. 23, 1973.

[52] U.S. Cl..................... 128/1 R, 195/1.8, 424/85
[51] Int. Cl......................... A61d 7/00, A61k 27/00
[58] Field of Search............... 128/1 R; 424/85, 100; 195/1.8

[56] References Cited
UNITED STATES PATENTS
3,687,806    8/1972    Bovenkamp......................... 195/1.8

OTHER PUBLICATIONS

Reproduction in Mammals, Artificial Control of Reproduction, Book 5, Cambridge press, 1972, Pages 17–31 & 93–101.

Journal of Reproduction, Fertility (1969) 18, Sept. 13, 1968.

Rowson, Moor and Lawson, Pages 517–523.

Journal of Reproduction, Fertility (1972), 28, Pages 313–315.

Lawson, Rowson and Adams, The Veterinary Annual, Grunsell, 1969, Pages 201–215.

Scientific American, Dec. 1968, Pages 180–191, Transplanted Nuclei and Cell Differentiation.

Class Project Paper, 1974, Univ. of Michigan, Pages 1–10, Induced Ovulation, Fertilization, and Analysis of Early Development in Normal and Hybrid Embryos.

*Primary Examiner*—Aldrich F. Medbery

[57] ABSTRACT

Disclosed are processes for reproduction of cellular bodies of herbivorous and omnivorous mammals. The techniques include obtaining ova, preparation of recipients and transplant techniques. Methods of sex selection of spermatozoa are shown as well as several techniques for clonal production of like embryos.

12 Claims, No Drawings

PROCESSES FOR REPRODUCTION OF CELLULAR BODIES

CROSS REFERENCE TO RELATED APPLICATIONS

This application is a continuation in part of my application Ser. No. 418,604 filed Nov. 23, 1973 entitled Improvements in Reproduction Processes for Cellular Bodies.

In the late 1890's Walter Heape in Cambridge, England, carried out experiments relating to egg transfer in animals. This research has been continued by many experimenters.

L.E.A. Rowson and his associates at the A.R.C. Unit of Reproductive Physiology and Biochemistry, Animal Research Station, Cambridge, England, have recently developed techniques for ova transplantation in mammels, particularly in farm animals. The Veterinary Annual, 1969, Bristol, John Wright & Sons Ltd., has an article by L.E.A. Rowson, pp. 200, entitled "Reproduction and Reproductive Disorders," which sets forth their developments. Techniques relating to these developments are also described in Book 5 of the Reproduction in Mammals Series, "Artificial Control of Reproduction" by C. R. Austin and R. V. Short, published in Cambridge at the University Press, 1972, see chapters one and four; and, one may also refer to the X Biennial Symposium on Animal Reproduction, American Society of Animal Science, as well as Sex Ratio At Birth-Prospects for Control, a Symposium published by the American Society of Animal Science, 1971. More generally developments in this area are reported in Science (U.S.), Nature (U.K.), Journal of Animal Science, Journal of Reproduction and Fertility and in the journal, The Biology of Reproduction.

These techniques, as developed and described in the above references, employ exogenous gonadotrophins to induce superovulation in a donor, sometimes superceded by oestrus synchronization of the donor and the hopeful foster recipients, followed by artificial insemination of the donor, surgical collection of oocytes after fertilization, embryo culture for a short period of time in commercially available tissue culture medium, and finally transplantation to the uterus of a synchronized recipient of one or more embryos for maturation of the fetus. Rabbits have been shown to be suitable temporary "receptacles" for the embryo prior to recipient transplantation, which is presently preferred to be done surgically, and these receptacles have been used to transport sheep embryos from England to South Africa, resulting in subsequent birth from their foster mother.

According to Austin and Short, pp. 30, slices of a rats ovary, treated with glycerol have been frozen to −79°C., thawed and transplanted to recipients. Mice embryos have reportedly also survived freezing to −196°C., thawed, and transplanted to recipients, who gave birth to normal and full term living fetuses or new born mice, see Science (U.S.), Vol. 178, pp. 411, Oct. 27, 1972. These developments relate to the techniques, as well as other separately known techniques which may be usefully employed to achieve the results described herein. For instance, it is well known that vasectomy may be performed to make teaser males as a method of detecting oestrus, as mounting is a reliable indication, which may be confirmed by a marking method as described in U.S. Pat. No. 3,076,431 of Feb. 5, 1963.

The techniques described herein are believed to represent an improved technique for increasing the reproductive potential of genetically superior cattle, as well as other form animals and mammals, when the methods, devices and compositions described are employed as indicated.

By employing the techniques described, it may be believed that egg transplantation will become a common practice, and that, contrary to the statement of C. Polge in the aforementioned "Artifical Control of Reproduction," it will not be long before the described techniques will be used in a similar way to artificial insemination in order to exploit the genetic potential of the female, and the male as well. These techniques can also exploit the true uterine capacity of females, as sheep, cattle and, indeed women, "appear to be rather exceptional in that the frequency of 'large litters' resulting from treatmenet with exogenous gonadotrophins must indicate quite a phenomeal uterine capacity." (C. Polge, pp. 25).

While the foregoing techniques have been used in experimental techniques, they utilize techniques which are not readily reproducible in large numbers and suffer from other difficiencies which are overcome by the improvements disclosed herein.

While various modifications, combinations and rearrangement will occur to those skilled in the art, both now, and in the future without departing from the scope of the claims appended hereto, it will be appreciated that the improvements disclosed herein make use of available materials or of materials described herein.

Thus, included in the object of the present disclosure are processes to make proctable increased availability of desired genetic material.

Accordingly, disclosed herein are improved techniques in tissue culture of embryos, freezing techniques for oocytes, methods of predetermining the sex of the embroyo which is transplanted use and techniques for clonal bodies so that several embryos of like genetic material may be obtained from the same donor.

The synchronization of donor and recipient is made less critical than hithertofore, permitting greater time delay in transplantation time.

The many improvements which are described hereinafter will be described in particular hereinafter, and consequently the foregoing is not intended to limit the techniques to be described, not to be an all inclusive description of the improvements which follow.

Among the objects of these improvements are improved processes for the clonal reproduction of a particular animal. The use of sterilized spermatozoa and a pseudo-fertilization solution are used to induct a reaction in an oocyte and the oocyte is caused to become diploid by use of the polar body originally contaminated, transferred or by nucleus transfer.

Additional clonal embryos are obtained by cell separation.

The spermatozoa may be presexed by the various techniques disclosed, and an improvement of this technique is an important part of this application.

Accordingly, a description of the preferred embodiments follows.

Oestrus can be determined by observation of mounting, which preferably, and most reliably, is done by a vasectomized or gomerized male animals. Such teaser bulls with mount cows at the start of oestrus. Vasectomized males with a portion of the vas deferens removed, or with the removal of the caudidymis, can copulate. By penis and prepuce deviation, copulation and the consequent transmission of disease may be prevented. Economics require that teaser bulls be rotated through lots of twenty to thirty cows monthly so as to obtain maxiumum usage while retaining reliability.

Mounting can be observed in close confinement or on the range by trained cowboys. However, a more reliable proof is obtained if the cow is marked by the mounting bull. Kamar, Inc. sells the device described in their aforementioned U.S. Pat. No. 3,076,431. Or the bull may be fitted with a marking halter designed for this purpose and supplied by American Breeders Service, DeForest, Wis.

A preferable means for marking is a topical application of pigmented grease or oil to that portion of the male which contacts the externally visable rump area of the female during mounting attempts. This may be applied to the brisket and underbelly of bulls.

The marks made upon the mounted female may be readily observed, permitting detection of oestrus even by the untrained. It is desireable that the formulation for the grease be harmless in topical applications and resistent to being washed off in the rain, but which can be removed with soapy water or detergents. A desireable vehicle is an oil in which a pigment is mixed. Different colors are desireable to employ, both with respect to providing a daily variation to the color markings.

Examples of desireable vehicles follow:

| Formulation | Parts/weight |
| --- | --- |
| Oleic acid or Olive Oil or Peanut Oil | 50% |
| Lecithin (soybean) | 1% |
| Caster Oil | 24% |
| Pigment, as follows: | 25% |
| Blue: Cobaltous chloride | |
| Black: Carbon Black | |
| Yellow: Calcium Chromate | |
| White: Precipitated Calcium Carbonate | |
| Redish: Vitriol red (Red Hematite) | |
| Red: Norman Red pigment | |

The above formulation meets the requirements and will prove quite satisfactory for optical applications as well as providing the desired color variations.

Preparation of teaser males can be accomplished by several techniques. Amounting to the greatest difficulty by the fact that it requires a skilled surgical technician is the surgical preparation of the male using penis and prepuce deviation, as described in Veterinary Medicine/Small Animal Clinician, April 1973, page 395. Utilizing this method, copulation is prevented.

However, since one of the important aspects of this description is to provide a readily reproduceable technique, I prefer the technique of resection of the epididymis, especially in the bovine species. The operation is performed with the bull, shortly before puberty. The operation to be described has a consequent benefit in that the same techniques can be utilized in potential market animals. Bulls grow much more rapidly than steers, and a weight with less fat content 8 percent greater than that which can be obtained with steers is to be expected.

The operation is performed in the standing position. The epididymal tails are removed from small ventral scrotal incisions. Local or heavy epidural anesthesia is used. The testicales are forced to the bottom of the scrotum. An incision of 3cm to 5cm is made through the skin and tunic directly over the tail of the epididymis. Dorsal pressure on the testicale is used to force the tail of the epididymis through the incision. The ligamentum of the epididymis which attaches the tail of the epididymis to the testicle is severed with scissors and the tail of the epididymis is held in position by the ductus deferens and the body of the epididymis, both of which pass dorsally up the side of the testicle. Suture material is used to jointly ligate the body of the epididymis close to the testicle. The tail of the epididymis is severed with scissors and removed. The procedure is repeated for the testicle on the other side. Antibiotic powder is applied to the wound which is closed with sucures or clamps. Wait 20 days before using the bull.

The limited numbers of occurances of oestrus in a sample group can be increased by synchronization. This can be accomplished by synchronization. The suppression of oestrus by gonadotrophens, particularly progestrogens, is useful in this regard.

Medroxyprogesterone acetate, C-methyl-17 acetoxy progesterone, (MAP, Upjohn) is a synthetic progesterone which has been used in an ethanolic solution to suppress oestrus. Melengestrol Acetate (MGA) is marketed by the Tuco Division of The Upjohn Company, Kalamazoo, Mich. 49001, as a food additive available to holders of approved Medicated Food Applications, and is a synthetic progestrogen that is used to suppress oestrus in order to improve rate of gain and feed conversion for feedlot heifers. It is not approved for synchronization purposes. Presumeably, this is because MGA produces abortions (Journal of Animal Science, Vol. 30, pp. 433) and the fertilization rate of ova is low while ovarian abnormalities is high (Abstract 155, Journal of Animal Science, Vol 35). MGA has been implanted in a polyurethane implant placed in a prominent ear vein or subcutaneously in the ear of heifers. Release rates of .4mg per day have been obtained.

MGA may be fed orally, daily, or incorporated in a grain diet (up to 4.0 miligrams in 1.82 kg of grain per day). I prefer to utilize 0.4 mg to 1.0 mg in 1.8 kg daily. The optimal amount may approximate 0.5 mg oral dosage daily. Oral dosages of .5mg daily have been shown to suppress oestrus and permit oestrus 2–9 days after withdrawal (Veterinary Medicine/Small Animal Clinician., Vol. 65, May 1970, pp. 491).

Using the preferred oral dosage in grain after withdrawal oestrus will occur 2–11 days after withdrawal with an average of 4.5 days ($\pm$ .5 days) after withdrawal. Heifers and mature female after birth should have a normal oestrous cycle before medication.

In order to improve the rate of ova fertilization and expected oestrus, on the day of withdrawal 10–20, preferably 15–17 mg, of the steroid Estradiol Benzoate (Arapahoe Chemicals, Inc., Boulder, Col.) is administered in an intra-muscular injection. This may be followed by a similar amount on the 5th day. The first amount may be reduced with a dosage of 15–17 mg on the 5th day proving satisfactory in most instances. The steroid may be introduced orally by mixture in ethanolic solution and then introduced in saline capsule form, or added to the grain ration.

While fertilization may occur during the first oestrus using the aforementioned technique, in cattle it will be preferred to wait until the second period where conception rates may be improved.

Preferably animals are inseminated on day 26 or 27 and again on day 28 if precise control of detection of oestrus and ovulation described herein is not employed. After synchronization oestrus can readily be detected using teaser bulls. As mentioned above this causes the females to be marked at the start of oestrus.

As previously mentioned, many mammals have a uterine capacity which permits maturation of a greater number of fetuses than is normal in the species. This makes multiple births or twinning especially desireable. However, it is recognized that twinning be desireable, but too many embryos are undesireable. In cattle the preferred method of inducement of twinning is a dose level of 5–15mg. FSH, preferably 7.5mg to 10 mg in 3.6 ml of 1% Na carboxymethyl cellulose (Abbott Laboratories, Chicago, Illinois) given commencing on day 14–16 of the estrous cycle intramuscularly twice daily for 5 days. Suppression of oestrus during this period may be desireable and accomplished as previously discusses with the synthetic progestrogens available from Upjohn as previously discussed (MAG). FSH-P available in 10cc vials of about 50mg FSH units can be obtained from Armour-Baldwin Laboratories, Omaha, Nebr. One-fifth of a vial provides a shitable dosage. FSH tends to overcome the tendency of PMS to produce the undesirable superovulation which may produce too many oocytes for maturation.

It is well recognized that twinning in cattle has disappointing side effects when different sexes are carried, as even one male of a litter will usually produce all female freemartins in the litter. Twinning has the result, however, of increasing the production of animals and the unhappy side affects can be overcome by using the sex control techniques later discussed.

Superovulation may be distinguished from the above twinning techniques, in that usually a greater number of ova are produced at ovulation.

Reproduction of selected individuals may be accomplished to utilize more fully and genetics of desireable females. The techniques of superovulation and transplantation of ova have been generally described. Certain improvements in these techniques and preferred steps will be fully described herein.

Suppression of oestrus is desireable in recipient mammals. The prior description may be referred to again. The cow or heifer that is to be superovulated should have a cycle sychronized with those of recipients, but because of fertility problems the ova should not be recovered until the second oestrus.

Multiple or super-ovulation may be induced by injection of 1,500 to 3,000 IU (international units) of PMS, pregnant mare serum. 2,000 IU is preferred for cattle, while one half the amount used for large animals is suitable for swine and sheep. PMS (Ayerest Laboratories) serum may be injected on the 16th day of the oestrus cycle, or between day 15–18. A single PMS injection induces hyperfollicular development, even in calves 4–14 weeks of age. It should be followed by an intravenous injection of 5 to 10mg of NIH-LH leutinizing hormone 5 days after the PMS injection. LH may be obtained from Diamond Laboratories, DeMoines, Iowa (vetrophin), each vial should have 5mg of NIH-FSH-S4 and NIH-LH-S1 activity. Twelve to twenty-four hours later the ova produced should be exposed to semen if insemination is to be accomplished in the donor animal.

It has been mentioned that instead of PMS serum, pituitary gonadrophins (FSH) may be substituted to cause twinning. Since these are rapidly dissapted, between the 12th and 18th day of the oestrus cycle, injections of 6–14mg (the lower level will produce fewer follicles which develop) twice daily for approximately five day, are required, given either in the previously described preferred manner or intramuscularly in physiological saline. It has been suggested that Nilevar (norethandrolone-no longer manufactured by Searle) is useful to prevent oestrus during this period (Journal Animal Science, Vol. 34, 1972, pp 77), but it is not desireable and a low level of MGA (.3–.5mg) can be used to accomplish this purpose and seems to increase the number of follicles. FSH-P (Armour-Baldwin) is a suitable pitutary gonadrophin, as previously mentioned. 10mg of prepared porcine FSH may be substituted. LH, eg. NIH-LH-S1 can be used to cause release at the end of the period.

After the onset of oestrus in cattle, they should be checked every 4 hours until the end of oestrus is detected and the ovaaries should be rectally palpated at four hour intervals until ovulation is detected. Animals should be inseminated, if done internally of the donor, with semen during the latter portion of oestrus.

The follicular development herein contemplated can be increased, especially when utilizing gonadotrophins by feeding a high energy content ration during the period of follicular development, 7–14 days after last oestrus.

This ration should double the weight of the normal grain ration, with the additional weight of the ration being provided by glucose, and other high energy sources as fat (lard) and mollasas.

At the start of this period, estradiol benzoate, in the dosage elsewhere described herein, is also desirable.

It is most desireable to obtain eggs from a superovulated female between 8 and 90 hours after ovulation. If the eggs have been internally inseminated, then the best period is between 50 and 80 hours, and preferably between 70 and 80 hours, at which time the eggs are mainly in the lower reaches of the oviduct before the ampullary-isthmic junction (a contraction before the uterus) and in the upper part of the uterine horn. This leads to a concentration of the oocytes in this local area.

This period is generally acceptable for non-inseminated subjects, but eggs will be found higher in the oviduct, even near the fimbriae. Here the best period is between 40 and 80 hours when most of the eggs have reached a point near the ampullary-isthmic junction.

In other animals, for example swine, the transport is even more rapid than the aforementioned conditions occurring in cattle.

Within the period flank laparotomy may be performed. The subjects should be taken off feed 24 hours before the surgery and each given an intramuscular injection of about 0.5ml of propiopromazine hydrochloride (e.g. Travet, Abbott Labs 50/mg. ml) 25 minutes before anesthesia. Anesthesia can be a procaine hydrochloride injection on both the dorsal and ventral sides of the first, third, and fifth lumbar vertebra, the amount being 100 to 150 ml depending on individual size.

The incision area is shaved and washed with aseptic solution. An incision can be made between the last rib and the external angle of the illium 15 to 20 cm in length. This can be done using a No. 22 Bard-Parker blade in a No. 4 Bard-Parker handle. Using an ecraseur a bilateral ovariectomy and salpingectomy is preformed.

Where an oviduct is disected the cervical end of the uterine horn is clamped and seared with a hot iron and the seared site punctured with a blunt needle of a 20–50 ml syringe containing sterile bovine blood serum (Difco, Detroit, Mich.) or preferably, when the oviduct is removed, TCM199 or, more preferable, the medium described and given as an example herein for embryo culture. The horn is flushed with serum (which may require 20 to 40 ml serum) and the passings collected in a sterile cup watch glass, the flushings passing through the oviduct. The oviduct is accordingly inserted with a tube having a collecting surge chamber for collecting the released oocytes. Aspiration of the tubule will help this process.

Alternate anesthesia includes an initial injection of pentobarbitone sodium followed in 15 minutes with closed circuit Fluothane and oxygen. The incision can be made immediately anterior to the pelvis in the midline through which the uterus and ovaries are withdrawn clamping off the horn. A mid-oviduct incision is made through which the tubulation is inserted. A syringe of 40 ml. is introduced ahead of the clamp and the oviduct flushed in the foregoing manner. The uterus is then returned to the abdomen and the wound sutured using No. 3 catgut followed by interupted sutures of the skin covered with tape.

Fertilized eggs may be transferred to a foster recipient mother whose oestrus is synchronized with a variation of ± 2 days.

Transplants use the same techniques as before, except that the ovary containing the corpus luteum is identified by rectal palpatation and the eggs are transferred to the adjacent uterine horn by using a Pasteur Pipette connected to a 1 ml syringe. If the corpus luteum is present on each ovary, eggs may be transplanted to both horns. However, unless this is present, twinning is not as likely. Provided that the eggs (blastomers) are sexed it is desireable to transplant two eggs to increase the likelihood of birth, but this may be done without too great fear of freemartins, since one birth for two oocytes is most likely.

Eggs may be kept if fertilized for a short period of time (10 hours) in a dialysis chamber, or incubation unit as later described for a longer period, or they may be transferred into the utero-tubal junction of a rabbit's oviduct which is litigated so that the eggs do not pass into the uterus. This facilitates their recovery when the oviduct is flushed to recover the eggs. Under these conditions, the eggs will divide normally up to about seven days, as is also possible in an incubator.

Care should be taken to be sure the recipient is synchronized to ± 2 days, preferably exactly. It usually takes four days after fertilization before the eggs enter the uterus where they can be collected from the cervix entry procedures two be outlined. Also, we should remember that about the same time is used when the eggs are recovered surgically from the oviduct and uterus. Recipients should receive the eggs before regression of the corpus luteum, and preferably within the period ending on the 6th or 7th day.

Using a pipette, and techniques like those used for artificial insemination, the eggs can be inserted via the cervis in cattle and horses (not swine), but aseptic conditions should be used to prevent purulent endometritis. Distension of the uterus with carbon dioxide is desireable for non-surgical transfers.

Non-surgical introduction of eggs into recipients, 2 or 3 of 6 cell to early morula stage, is accomplished starting with drawing the eggs along with 0.5 ml medium or serum into an ordinary insemination pipette which is curved at one end, all under aseptic conditions. The pipette is introduced through a sterile speculum into the cervical canal of the recipient and passed forward along the uterine horn which has had the corpus luteum detected previously by rectal palpation. $CO_2$ is introduced via the same pipette until the uterus is fully distended. The equipment comprises two flasks, one containing dry ice pieces which are covered with ethanol and which flask is connected to the second flask beneath a water line (the second flask is half filled with distilled water). The upper space of the second flask is connected to a tee fitting, one side of which leads to the pipette and the other side to a rubber balloon which distends as pressure within the uterus increases. Immediately after gassing the pipette is withdrawn and the uterus should remain distended for 4 to 6 hours.

Transplantation by these non-surgical techniques contemplates the use of a flexible cannula made preferably of Silastic (TM of Dow Chemical) tubing in a pipette. The pipette is inserted into the uterine horn and the cannula is passed (through the pipette) to expel the transplant into the uterine horn, or with small size transplants, into the oviduct through the isthmic junction.

Before transfer of fertilized ova to the recipient it will be desireable to sex the embryo being transferred. This can be done in a variety of ways. Clearly, the fertilization of the oocyte with ordinary spermatazoa will result in a 50 percent count of one sex. Yet, since it is possible to maintain the embroyo in vitro for a period of time, as will be described, it is also possible to microscopically determine with an electron microscope whether the X or Y chromozone is present in cells of the embryo.

Cells of the morula stage or the blastocyst are excised from the embroyo. With the blastocyst, which is the more desireable in view of the lowest damage risk, the zona pellucida is held with a pipette under suction and the trophoblast penetrated with a needle large enough to excise one or two cells.

In order to examine cells for chromozone content, 0.075 KCl (Gibco No. R15-0575) is mixed to a total volume of 4 ml and refrigerated. The cells are suspended in .5ml of fetal calf serum and 0.5ml of hypotonic solution added and followed with 3.5ml just before centrifugation. Centrifuge for six minutes at 750 rpm. The elapsed time from addition to termination should not exceed 12 minutes. Discard all but 0.25 ml of supernatant and re-suspend the cells in the remaining supernatant. Fix with three parts absolute alchol to one part of glacial acetic acid by first adding 0.5 ml and follow with 3.5 ml of fixative solution. The cells should stand in fixative solution 15 minutes. Discard all but 0.25 ml of fixative supernatant and repeat the fixation procedure.

After the fixation procedure has been repeated, remove all but 0.5 ml fixative solution and re-suspend the cells. Place two drops with the cells on a clean chilled wet glass slide and blow dry. Then stain with two drops of Aceto-Orcin stain (Gibco No. 537, 538, 539). Then examine the cells under an electron microscope and not the chromozone characteristics.

Slaughtered animals may be a source of oocytes which may be transferred to living recipients for maturation. Slaughtered animals are treated prior to slaughter as if normal surgical or non-surgical procedures are to be adopted. The time of slaughter should correspond to that outlined for surgical techniques. The animal may be slaughtered after fertilization or before insemination as in surgical recovery techniques.

Slaughter is accomplished by stunning the animal and bleeding. While bleeding is being accomplished, an incision is made ventrally and the ovaries, oviducts, and the uterine horns are recovered intact. The uterine horns are immediately clamped and seared. The organs are placed in a transfer incubator to maintain the organs at 30° to 38°C., preferably 31°–33°C., and transferred to the point where the eggs are to be recovered.

The recovery is accomplished by severing the oviduct and the eggs are flushed from the oviduct by insertion of a syringe through the uterine horn and injecting 20–40 ml of serum or preferably tissue culture medium (TCM199 or Ham's F10 or F12, Gibco).

The eggs are deposited in a watch glass and covered with parafine oil. They are examined at 50X and collected and transferred to the preferred tissue culture medium described herein and subsequently to the recipient.

Unfertilized oocytes can also be recovered from the ovary by aspiration of the corpus luteum of the slaughtered animal. These may be fertilized as elsewhere described.

Between recovery and transfer to a recipient it is desireable to culture the embryo in tissue culture medium such as TCM199 or Ham's F10 and preferably the formulations described by way of examples herein. The culture is maintained in a commercial incubator for tissue cultures at temperatures ranging from 31°C. to 37°C. with 5% $CO_2$ and 95% air or oxygen. Lower temperatures in the range (31°–33°C) are preferred. Some success will be had at the normal tissue culture range 37°C.

Culture chambers can be glass specimen tubes (30 by 100 mm or 25 by 75 mm) with silicone rubber stoppers. The inner surface of the tube should be coated with silicone to prevent attachment of the growth to the glass wall. Half of the tube is filled with culture medium buffered with HEPES buffer, and 20% bovine serum, and the other half with the gas mixture which is renewed every 8 hours. Tubes should be laid horizontally on rollers and continuously rotated at 30 to 40 revolutions per minute during incubation.

When the eggs are recovered, the flushings are collected into the tubes. After 3ml of fluid is removed at the bottom of each tube after 20 minutes at incubation temperatures and transferred to a watch glass or well slide and the ova is sought under a disecting microscope at 50 X or 187.5X and examined at 450X or 1875X.

Eggs can then be transferred to the cecipients in the manner described, or to longer duration culture in tubes or rabbits.

The preferred culture medium, as shown in the following example includes Vitamin B12, Lipoicacid, Sodium pyruvate and L-Glutamine. It is buffered with HEPES buffer and $NaHCO_3$ to a pH of 7.3–7.4.

| PREFERRED EXAMPLE CULTURE MEDIUM | mg./Liter |
|---|---|
| NaCL | 6800. |
| Kcl | 400. |
| $MgSO_4.7H_2O$ | 200. |
| $Na_2HPO_4.2H_2O$ | 60. |
| $KH_2PO_4$ | 60. |
| Glucose | 1800. |
| Phenol red | 10. |
| CaCl (anhyd.) | 200. |
| $NaHCO_3$ (depending on pH) | 400. |
| L-Arginine HCl | 70.0 |
| L-Histidine HCl | 20.0 |
| L-Lysine monohydrochloride | 70.0 |
| DL-Tryptophan | 20.0 |
| DL-Phenylalanine | 50.0 |
| DL-Methionine | 30.0 |
| DL-Serine | 50.0 |
| DL-Threonine | 60.0 |
| DL-Leucine | 120.0 |
| DL-Isoleucine | 40.0 |
| DL-Valine | 50.0 |
| DL-Glutamic acid monohydrate | 150.0 |
| DL-Aspartic acid | 60.0 |
| DL-Alpha-Alanine | 50.0 |
| L-Proline | 40.0 |
| L-Hydroxyproline | 10.0 |
| Glycine | 50.0 |
| L-Glutamine | 100.0 |
| Sodium acetate | 50.0 |
| L-Cystine | 20.0 |
| L-Tyrosine | 40.0 |
| L-Cysteine HCl | 0.1 |
| Adenine Sulfate | 10.0 |
| Guanine HCl | 0.3 |
| Xanthine | 0.3 |
| Hypoxanthine | 0.3 |
| Uracil | 0.3 |
| Thymine | 0.3 |
| Disodium alpha to copherol phosphate | 0.01 |
| Thiamine HCl | 0.01 |
| Pyridoxine HCl | 0.025 |
| Riboflavin | 0.010 |
| Pyridoxal HCl | 0.025 |
| Niacin | 0.025 |
| Ca pantothenate | 0.010 |
| i-Inositol | 0.050 |
| Ascorbic acid | 0.050 |
| Folic acid | 0.010 |
| Para-Aminobenzoic acid | 0.050 |
| Feric nitrate $Fe(NO_3)_3$ | 0.100 |
| d-Biotin | 0.100 |
| Menadione | 0.010 |
| Glutathione | 0.050 |
| Vitamin A | 0.100 |
| Calciferol | 0.200 |
| Tween 80 (Trademark Atlas Powder) | 20.0 |
| Adenylic acid | 0.200 |
| Adenosinetriphosphate | 1.0 |
| Desoxyribose | 0.5 |
| Ribose | 0.5 |
| Choline Cl | 0.5 |
| Vitamin $B_{12}$ | 1.3 |
| Lipoic acid | 0.2 |
| Sodium pyruvate | 110.0 |
| L-Glutamine | 200.0 |

Plus 20% fetal calf serum, heat inactivated, per liter of above example.

EXAMPLE 2

Same as above but Earle's salts (Gibco) are substituted for the salts of the first example while Glucose is still 1,800 mg/L.

EXAMPLE 3

Same as example two with twice the vitamins and amino acids by weight.

EXAMPLE 4

Same as first example with twice the vitamins and amino acids by weight and with Glucose at 1,000.0 mg/L.

Oocytes may be removed from the corpus luteum and matured in vitro. A number 20 needle is attached to a 100 ml syringe filled with 20 ml of culture medium. The corpus luteum is identified by laparoscopy performed 32–36 hours after gonadotrophin injection to cause follicular development or in the first 24 hours of heat or oestrus in cattle, preferably before 14 hours have elapsed after detection.

A 15–20 cm incision is made as described for surgical recovery of ova or mid-ventrally above the udder in cattle. The abdominal cavity is distended with $CO_2$ and a labroscope inserted to locate the ovaries and the corpus luteum. The corpus luteum is penetrated with the needle and the oocyte aspirated under steady vacuum.

The oocyte is transferred to a watch glass having 5 ml of medium covered with parafin or mineral oil. Cumulus cells surrounding the oocyte are removed with exposure to hyaluronidase for three to five minutes. The oocyte is removed with a pipette and 0.1 ml of medium and washed twice with 2 ml of medium. Care should be used to be sure that the oocytes are always covered with medium or PBS medium (Dulbecco's phosphate buffered salt solution) to prevent dehydration.

Oocytes aspirated from the folicule will mature in vitro when the follicular development has been initiated by gonadotrophin injections as used in causing superovulation and the oocytes are removed from the walls of thinned (developed) follicules.

Oocytes will mature when recovered from the corpus luteum of mature follicules in about four hours, as the cumulus cells are separated. There usually is no need to separate the cumulus oophorus.

Oocytes may be obtained by slaughter 6 to 14 hours after oestrus detection. The oviducts are separated into one-eighth sections and the unopened corpus luteum should be aspirated as well. The sections and the aspirated corpus luteum oocytes should be placed in medium covered with parafin oil or mineral oil.

Whenever the oocytes are recovered they should be kept warm in an incubator or on a warm stage of a disecting microscope. The parafin oil should be equilibrated with 5% $CO_2$ in air in the culture medium.

If necessary the cumulus cell clot should be withdrawn.

Care should be observed to retain an amount of fresh follicular fluid as 0.1 ml of follicular fluid is introduced with 0.4 ml of sperm having a concentration of one to two million per ml. Within two to four hours the cumulus cells surrounding the oocytes separate and form a layer on the surface. By five to seven hours in concentration the fertilization is complete and the eggs can be placed in culture for maturation to the morula stage or transferred to a recipient.

The fertilization in vitro utilizes the examples of formulation of the culture medium buffered to pH7.3–7.5 with Sodium Bicarbonate and dilute HCl. Sodium pyruvate or sodium oxaloacetate should be part of this fertilization medium and bovine albumen at 30% by volume utilized. The medium for fertilization and culture should contain 50 milligrams of streptomycin sulfate/ml and 75mg penicillin G (potassium salt)/ml should also be added. These however should be used when sperm separation by sex is used.

Synchronization of the donor and recipient as to ovluation time can be overcome by employing improved techniques.

A delay can be achieved by culture of the transplanted cellular bodies for a period of time.

This can be accomplished by the freezing techniques described herein, or by moving back the development of the donor cell by separation of the cell so that the total number of differentiated cells which are transplanted are at the stage that they would be had normal progress been permitted.

Thus, it is preferred to transplant cellular bodies to recipients at the time corresponding to a few days from the time of division of the first cell or the cellular bodies and the time of normal fertilization of the recipient. The object is to provide the donor cell to the recipient at a time approximately that which permits implantation at the blastocyst stage of development.

This is preferably 12 days of synchronization of the expected blastocyst or morula stage of the embroyo and the date the recipient would expect its own blastocyst or morula stage.

Such timing permits greater use of non-surgical transplantation, as well as surgical transplants at a later time, and should be done before the 10th day after receipient ovulation, preferably before the 7th day after ovulation.

The cell separation techniques and freezing techniques used to accomplish this result are disclosed elsewhere herein.

Sex determination is important for many reasons and can be accomplished by sexing an embryo after fertilization or in other ways as described herein.

Spermatazoa may be presexed by seperation of the X and Y chromozone bearing spermatazoa, and the resultant seperation utilized to fertilize matured oocytes.

One method of accomplishing seperation is by centrifugation of closed pipettes containing semen at 750 rpm several times. The "female" sperm will weigh slightly more and they tend to be concentrated at the lower portion of the tube. Spermatozoa should be suspended in a thin buffered solution during centrifugation. Electrophorisis has been used to seperate spermatozoa. Neither of these techniques are particularly satisfactory in the current state of the art.

However, an improved technique using ion exchange materials may be employed as described herein. It is recognized that spermatozoa have a net negative charge, but there appears to be a localization of the charge on either the head or tail of the spermatozoom. Better results appear possible to yield the desired female spermatozoa using ion exchange materials, alone or in combination with centrifugation.

Cations are used to produce entrapment of "male" sperm, and anions used to entrap "female" spermatozoa. This can be done by inducing floculation of the undesired sperm in a watch glass having high surface area to volume, the preferred method being described below.

While it is recognized that greensands and zeolites can be used as the ion exchange materials, the more satisactory are finely divided ion exchange resins. Cation results of the carboxylic divinyl benzene copolymers or the products of copolymerization of methacylic acid with divinyl benzene and those of maleic anhydride with styrene and divinyl benzene prove suitable. Streptomycin is not used in the support medium with carboxylic resins due to its ion exchange with them. These cation resins will yield spermatozoa capable of producing female offspring.

Anionic exchangers can be produced by nitration and subsequent reduction of styrene divinyl benzene copolymers. These will yield spermatozoa capable of producing males.

The resultant resins having the following structures:

Base Anion Exhange Resin

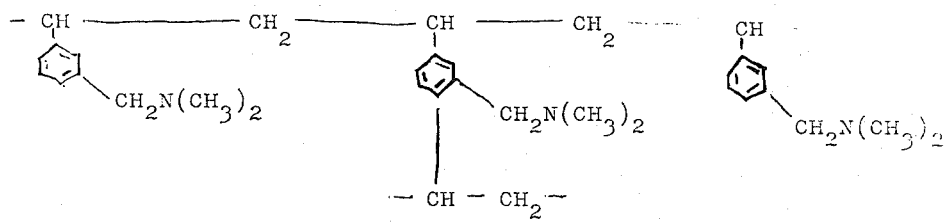

Acid Cation Exhange Resin

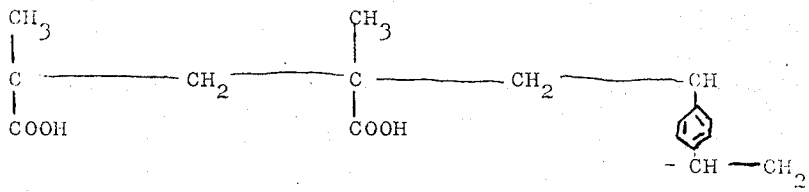

The resins which are used can be based on Dowex Resins (Trademark Dow Chemical Company, Midland, Michigan). The more strongly basic anion resins of the styrene-divinylbenzene type, Dowex 1, 2, 21K, can be used, but the polystyrene polyamine Dowex 3 which is weakly basic can be better used in medium with a pH range up to 7.1–7.3. Mesh size 100 or greater (100–300) is preferred. Suitable resins are B342–AG3, B343–AG3 (both polystyrene polyamines) and B143–AG1, B144–AG1, (polystyrene guaternary amonium) as anions and B544–AG50, B545–AG50 (based on Dowex 50) as cations may be used and obtained from Bio-Rad Laboratories, Richmond, California.

Anion and Cation type resins may be of the cellulose type, with the cation type being preferable. A 100 to 200 mesh exchanger of Type 20 CM-cellulose (carboxymethyl cellulose) from Brown Company, 555 Fifth Ave., New York, N.Y., can be used.

To obtain the sample, the semen is washed twice and supported in a buffer solution with pH 7.3–7.5. The resin is introduced into a test tube with a funnel lower end and an enlarged lip, which test tube is in turn supported within a collecting test tube. The sperm is introduced above the resin and caused to percolate through the resin, preferably by centrifugation at 750 rpm for 1 minute or longer. The base of the outer collecting tube has additional buffer support solution to collect the seperated sperm.

The sperm is then stratified, and the desired spermatazoa removed and used for insemination or frozen.

Another technique contemplated to be used or in combination with the aforementioned ion exchange materials for seperation of sperm fractions is a combination of centrifugation and pressure differentials.

This technique is especially effective with cattle due to the great difference in size of the X and Y spermatazoa. A conical tube separation chamber of a counter-streaming centrifuge is used. The desired female fraction is obtained by placing washed and dilluted semen in the centrifuge, alone, or in combination with the appropriate ion exchanger, and the dillutent sollution centrifuged at 750 r.p.m., at a speed lower than 1000 rep. m.. Here is a second, or third, force applied, namely, the application of a pressure differential of 15–30 cm from than at which the sperm was obtained.

For male sellection the above techniques are applied, and the speed is raised to be greater than 1,000 r.p.m. and less than 1,200 r.p.m. A vacuum in the order of 15–30 cm is applied as a differential compared to that of sperm recovery pressure.

The fractions are thus obtained and withdrawn from the dillutent and concentrated. They may then be used for insemination or frozen in a buffer solution for later use.

The preferred embodiment utilizes counter-streaming centrifugation in combination with an ion exchange material. While the pressure differential appears to improve results, satisfactory fractions may be obtained as otherwise described. Such fractions are used to inseminate recovered ova.

Sex can be determined by examination of the cells removed from an embryo. At the blastocyst stage, the embryo is placed in a chamber on the heated stage of a disecting microscope of the phase contrast type. The zona pellicuda is held with a micropipette, under slight vacuum. The cells are removed by placing a second micropipette against the zona pellicuda with slight pressure in the trophoblast region, and a capillary needle is inserted into the cells and a few cells are withdrawn from the trophoblast. These can be then examined with an electron microscope to determine sex.

When sex has been determined the blastocyst can be transferred to a recipient and allowed to mature.

Cells of the embryo can have several different operations performed which aid in the reproduction of genetically superior animals and make possible like sexes to be carried by the recipients. This make possible utilizing more fully the uterine capacity of cattle, by avoiding freemartins, and is applicable to other species.

Fertilized ova and small embryo, preferably no greater in size than the morula stage may be frozen to $-196°C$. This is accomplished by washing the embryo in 2 ml of medium, as described herein by example, or with PBS solution. One recovered from the corpus luteum should heave extraneous cumulus cells of the graphian follicule removed by exposing them to hyaluronidase (150 U.S. pharmacopeia units per milliter) in the medium for 3 to 5 minutes.

In a very small drop (approximately 0.01 ml) medium, the eggs are transferred to pipettes containing 0.1 ml of medium. The cooling is done in a bath at a rate less than 2°C. per minute with the optimum between 0.3° and 0.4°C. per minute. At 0°C., 0.1 ml of 2 M dimethyl sulfoxide is added as a buffer. After 15 or more minutes the samples are transferred to a bath of approximately −4°C. and seeded two minutes later with a minute ice crystal. Samples are then cooled at the same rate to −70°C. and then to −110°C (ethanol and dry ice bath) and then transferred directly to liquid nitrogen (−196°C.). Liquid helium can be used to cause the temperature gradient and rate of cooling.

Thawing is done by placing the pipette in a tube 40 × 200 mm in −110°c. ethanol and warmed by contact with room temperature air at 4° per minute, measured starting −65°C. At 0°C. then 0.2, then another 0.2 and finally 0.4 ml of culture medium is added. The embryo are then transferred to 1 ml of medium and rinsed twice with a like amount. They are examined at 50X to determine the recovery rate and transferred to culture, eg to a watch glass under mineral oil at 30°-38°C. (Preferably 31°-33°C.) in a 5% $CO_2$ and oxygen or air atmosphere.

The cellular bodies which are thus frozen should be frozen in the preferred medium herein containing sodium pyruvate or sodium oxaloacetate in equal amounts. PBS solution containing these substances may also be used, and the addition of glucose is also desireable.

It is important to increase the utilization of recovered ova and to freeze in the same container embryo of the same sex.

To this end it is desireable to seperate individual cells of one ovum with a lysin, as described herein, and to place cells of like character in the same container.

The lysin seperated cells are fully capable of differentiation after thawing and improved results are obtained in the freezing process.

The zona pellicuda of the morula stage or lower embroyonic cellular body, including those which are seperated by lysin treatment, may be desireabley removed before freezing.

After thawing the cellular bodies may be protected by transfer to the zona pellicuda of a second cell.

These procedures are described in more detail elsewhere.

Oospheres may be frozen in the foregoing manner and thawed to 0°C. and successive drops of sperm, preferably with follicular fluid, as later described, mixed with the support medium until the amount of fluid support medium is approximately 0.8 ml to 1 ml and the medium is allowed to warm by exposure to air temperature for 3 hours. For a more detailed description of in vitro fertilization reference may be had to the example given without reference to freezing elsewhere.

The operations on cells, morulas and blastocysts are performed with the aid of a phase contrast disecting microscope. The cell support employed is a small cup shaped watch glass which has been covered and has access aperatures of small side in the sides through which the operating tools may be inserted. These holes and the coverplate are sealed with silicone oil film, and the tools may be held with micropositioners and inserted through the oil fillm. The microscope stage should be heated.

Microneedles may be made from 1 mm Pyrex (Trademark of Corning Glass) or borosilica glass rod drawn out to form a thin shaft (about 0.3 mm) 50 mm long. A vertical bend is made to provide clearance between the microtool holder and the stage of the microscope. The thinner shaft is hooked to carry a weight, and then the hooked shaft is loaded with a 1 g. load and drawn out at an angle of 45°. The tip is formed with a bead which is then wiped off, or for a hooked needle the tip is cooled slightly and then bent at an angle of approximately 120° so as to form a hooked needle with an included angle of about 60°.

Micropipettes are made like needles starting with 1mm glass capillaries. Between drawing operations the pipette is hooked, and finally the pipette is also drawn to a very thin portion with a 250 mg load at a 45° angle. The orifice is formed at the surface to form a bevelled bead orifice. Commercial micropositioners (Leitz) may be used to hold the tools with operations being performed within the cells with the tools thus prepared being held with the micropositioners.

At the two cell stage before division the cells should be closely observed to watch for division to the four cell stage. At the four cell stage, the upper and lower quadrants of the same hemisphere of the four cell stage can be microsurgically separated by mechanically passing a glass microneedle through the zona pellicuda (if it has not been previously removed with lysins) and then with slow steady pressure seperating the two hemispheres. This procedure may be used to produce identical twins.

Cloning of a fertilized ova is possible. The technique to be utilized herein is to remove the zona pellicuda at the morula stage of development or at the 8 to 16 cell stage by trypsination. The cells are suspended in the broth and exposed to the trypsin solution and after 15 minutes mechanically agitated with a glass microneedle to seperate individual cells. The cells are washed quickly with phosphate buffered medium.

Concurrently therewith it is desireable to have additional donee ova available with the zona pellicuda intact. With a sterile needle under the microscope the individual donee cells have their nucleus removed or destroyed. The donor cells are aspirated into a needle attached to a syringe and the cell is injected into the nuclear region of the donee cells, and subsequently, these donee cells are transferred to culture or to the cecipient for maturation. Normally the cells are observed through the first division after the injection before transfer.

The zona pellucida can be removed by trypsin and the cells disassociated by trypsination or other lysin.

Cells may be suspended in the preferred medium or in Eagle's basic medium, both modified to have twice the usual amount of amino acids and vitamins (80 parts/volume), typtose phosphate broth (10 parts/volume) and bovine albumen serum (10 parts/volume) in a 112 ml flat petri dish having 20 ml medium under parafin or mineral oil. Then 0.5% solution of sodium edetate in a 1% solution of trypsin is added to the medium. The cells should be incubated for 15-30 minutes until the zona pellicuda is removed.

Dissociation of the cells after the zona pellicuda is removed may be accomplished by a 0.1% trypsin crystallized once (Worthington Biochemical Corp., Freehold, N.J.) in PBS solution (phosphate buffered saline with Eagles salts) and after 15-30 minutes gently pipetted. You can use 0.01 ml of PBS with .005 of trypsin solution. Detachment can be aided by stirring or other mechanical help, as by insertion of a fine needle into the cell mass and agitating.

After detachment with trypsin or other lysin, a sterile syringe is filled with about 0.1 ml of medium and the cells removed and washed twice with clean solution to remove the trypsin. One or more of the cells can be sexed with the help of an electron microscope.

If it is desired to change repeating the above type of cloning, the cells must be permitted to grow again to the morula stage in culture, the cells being placed in 2-4 ml culture medium in a 32 mm plastic tissue culture petri dish, and placed in a larger dish containing 1.0 ml of PBS solution and tightly sealed in plastic bags to grow to a larger size.

However, it should be understood that each repeat process greatly increases the likelihood that incomplete embryo will develop.

It is possible to have development of the seperated cells without the zona pellicuda, but the zona pellicuda acts as a natural protection within the reecipient and survival to maturation is thus more easily obtained. As previously stated, this is accomplished by transfer of the donor cell to a donee cell. This is accomplished by aspirating the cell and injecting it into a donee cell which has its zona pellicuda intact and its nucleus destroyed. This is accomplished in various manners, these being described below.

An oocyte is held with a pipette under a disecting microscope. The zona pellicuda is pennetrated with a hooked needle and the necleus is pulled out of the cell or destroyed with agitation. Then into this region the donor cell is implanted. The necleus can also be by causing extrusion of the chromozones from the cell if a cell is capapable of division. During metaphase a small drop of silicone oil is placed adjacent the cell, and the cell will extrude the chromozones into the oil where they can be removed. However the mechanical removal of the nuclear protoplasm is preferred, and the use of dividing cells in interphase or the oocyte can be used. It is also possible to withdraw the necleus with a capillary needle by aspiration. By using fine needles the cell deformation caused by thicker needles is avoided.

Another technique for transfer of cellular bodies from one embryo is to remove the cell from the zona pellucida by lysin application or surgically. Thereafter the removed cell or cells are transplanted to a new zona pellicuda and allowed to develop therein. The necleus of the original cell can be destroyed by ennucleation, destruction of the necleus, as is preferred, or by excision.

These techniques or combinations thereof can be employed to delay the time of necessary transplant and to achieve more clonal bodies.

The transplanted cells can be transplanted in their entirety, or only the necleus and surrounding cytoplasm can be transplanted to the new cell body. If the latter is used, it is necessary to enneculeate the recipient cell and to transfer the necleus and surrounding cytoplasm into the cytoplasm of the foster cell.

While the above described technique is simple and expedient, it is also contemplated that alternative techniques can be employed. The donor cell zona pellicuda can remain intact and cells removed from the blastomere or morula and transferred in the foregoing manner to a donee cell. The cells may be extracted as complete cells and good results may be obtained. However, it is also possible to extract the necleus itself and transfer this necleus to the donee cell. The timing of this last technique is more critical, as both the necleus and the donee cell has a tendency to disintegrate, and the transfer must be accomplished by conducting both operations in parallel or in a short time.

These techniques produce identical "twins" which are not of the same genetic material as the father or mother, containing genes from both, as the genetic characteristics are determined by fertilization before separation of the embryonic cells.

Female offspring having the same genetic material as the mother animal may be especially desireable.

New individuals have already been created in the lower animals without fertilization by spermatazoa. Turkey eggs have been "fertilized" with viruses, to produce male turkeys.

According to two techniques described hereinbelow utilization of the chromozone content of the female alone is contemplated.

Two oocytes are employed. Each oocyte is a secondary oocyte which has elinated a single polar body and reached the mitotic metaphase of the second maturation division, as it is at the time of ovulation.

Both the polar body and the pronucleus are haploid. The two oocytes are placed in a closed disecting chamber on the heated stage of a phase contrast disecting microscope. Pressue within the chamber is carefully monitored. The support medium should be fortified with glucose and in the proportion by weight described in Example I. The support medium may be the same used for trypsinization, with an equal amount of hyaluronidaze and trypzin added. The donee cell is punctured and the vitelline membrane closely observed for the formation of cortical granules. Within 5-10 minutes the pronucleus of the trypsinized second oocyte has its necessary development and it is removed and injected into the first donee oocyte. Then equal amounts of Androgamone III, a fatty acid, and sodium dodecyl sulfate and bee venom is added to the support medium. From the equal percentage by weight of trypsin, hyaluronidase and the Androgamone III, sodium dodecyl sulfate and bee venom, a pseudo fertilization of the donee cell is obtained to some extent.

As a substitute a washed, dense, suspension of spermatazoa may made in the trypsin solution and centrifuged at high speed. The supernatant will contain an extract which is substituted to the same amount by weight as the fatty acids and detergents at the same point of time in the process.

The polar body may be substituted for the pronecleus of the second oocyte in a second embodiment.

When metaphase is observed, the result of the joining of the two haploid bodies have fused to form the diploid zygote and the sex of the embroyo is determined by chromozones obtained solely from the mother animal.

When the cell has been observed to have the violent reaction characteristic of fertilization the diploid zygote is removed, washed and transferred to culture medium.

Thereafter the cell is watched to determine whether normal division occurs and thereafter it may be handled as if the cell is a result of normal fertilization.

Living sterile spematazoa are capable of initiating the pseudo-fertilization. Such spermatozoa are obtained by subjecting normal spematozoa to ultraviolet light. The amount of exposure is variable, and depends upon the species, the proximity of the light source and the time of exposure. Too much exposure will kill the spermatozoa. The preferred time of exposure ranges quite widely, as 30 seconds to 3 minutes have yield satisfactory results.

Such sterile ultraviolet irridiated (or sterilized in another manner as by exposure to radiation, as is done with fly control programs) can initiate the telophase development.

The expulsion of the polar body would normally result in a haploid body, which while progressing with divisions, will not mature.

In addition to the aforementioned methods of supplying an additional haploid body, alternative approaches may be utilized to produce the desired diploid.

While the normal oocyte development temperature of cattle is between 100° and 102.5° F., the oocytes may be collected and maintained at a lower temperature.

Cattle, swine and horses yield ova which can be cultured at 37° C or as previously mentioned desirable results can be obtained at even lower temperatures in the 30°–34° C range and preferably 31° C to 33° C.

Pseudo fertilization can be achieved at these temperatures by the aforementioned process. This should be done under a microscope so that development of the "fertilized" ova can be observed. When it is noted that the second polar body is progressing toward but before occurrence of, expulsion through the vitilene membrane, the ova should be subjected to heat shock of approximately 10° C placing the culture slide in a water bath of the higher temperature. This raises the temperature above normal temperature by below the temperature at which the cell would die.

While yield is quite low, it has been observed that normal diploid bodies do result. These diode in the normal course and can be transplanted for further development. The cells may be cultured and additional clonal copies made by cell separation of the embroyo, as aforesaid.

Yield may be improved by implanting the necleus obtained from another ovum of the same animal, as mentioned before. Heat shock may be used in conjunction with this treatment. This technique may be combined with the use of sterile sperm to produce clonal cellular bodies.

Another example of preselected sperm which may be utilized in fertilization of an oocyte employs the aforementioned technique of separation, preferably through a cation exchange resin, and with a medium containing 20–40 percent alfunem, preferably bovine albumen (Grand Island Biological Company). Here the aforementioned cation exchange resins should be utilized. The resulting sperm will comprises a greater percentage of female producing sperm.

In practice when attempting to cause clonal copies of the genotype of the donor, the use of presexed but sterile sperm may assure a greater yield of transplantable bodies, since the same unsterile spermatazoa may be effective to cause true fertilization, and the result, while not a genotype of the donor, will be usable as a transplant body.

What is claimed is:

1. An embryo transplantation process by which clonally derived bodies of a specific genotype is prepared from female gametes of herbivorous and omnivorous hoofed mammals to permit reproduction of a clonal genotype comprising:

obtaining an oocyte from a selected donor mammal and placing it in a life support solution, thereafter causing the occurance of a fertilization simulating reaction within said oocyte by exposure of said oocyte to a pseudo-fertilization means, and inducing formation of a diploid necleus within said oocyte by fusion of a first and second genome within the cytoplasm thereof, the first of said fenomes consisting of the haploid set of chromozones contained in the pronecleus of said oocyte, and the second of said genomes consisting of the haploid set of chromozones which would normally form a polar body or consisting of that haploid set of chromozones of the pronecleus of a second oocyte which has passed the first polar body and reached the mitotic metaphase of the second maturation division.

2. A process according to claim 1 in which the oocyte is maintained below normal body temperature before exposure to said pseudo-fertilization means and thereafter said oocyte is exposed to said pseudo-fertilization means and subjected to heat shock to entrap said second genome as those chromozones which would have been expelled as the second polar body.

3. A process according to claim 1 wherein after said reaction said oocyte is subjected to heat shock by elevating the temperature thereof by at least 10°C. without reaching the temperature at which the cell would die.

4. A process according to claim 1 wherein said reaction is initiated with sterile sperm.

5. A process according to claim 1 wherein said reaction is initiated by pucture of said cell to initiate formation of cortical granules after which a pseudo-fertilization solution is added to said support solution.

6. A process according to claim 1 wherein the genome which comprises said second genome is a polar body which has been injected into said first oocyte after the second maturation division thereof.

7. A process according to claim 1 wherein said second genome is the pronecleus of said second oocyte which has been ennecleated from said second oocyte and injected into said first oocyte.

8. A process according to claim 1 in which subsequent to the formation of said diploid necleus the zygote is permitted to differentiate and cells of the partially developed embryo are separated therefrom to form separate developing embryos.

9. A process according to claim 4 wherein the sperm which are sterilized are typed for sex characterization.

10. A diferentiated cellular body derived by the process of claim 1.

11. A differentiated cellular body derived by the process of claim 7.

12. A differentiated cellular body derived by the process of claim 6.

* * * * *

Disclaimer and Dedication

3,866,598.—*Lynn Lawrence Augspurger*, Birmingham, Mich. PROCESSES FOR REPRODUCTION OF CELLULAR BODIES. Patent dated Feb. 18, 1975. Disclaimer and Dedication filed Oct. 15, 1982, by the inventor.

The term of this patent subsequent to Dec. 17, 1991 has been disclaimed and dedicated to the Public.

[*Official Gazette December 28, 1982.*]